United States Patent
Ulchak et al.

(10) Patent No.: US 9,694,979 B2
(45) Date of Patent: Jul. 4, 2017

(54) PLATE CONVEYOR BELT

(71) Applicant: Cambridge International Inc., Cambridge, MD (US)

(72) Inventors: Jeffrey D. Ulchak, Salisbury, MD (US); Thomas O. Perdue, Salisbury, MD (US)

(73) Assignee: CAMBRIDGE INTERNATIONAL INC., Cambridge, MD (US)

( * ) Notice: Subject to any disclaimer, the term of this patent is extended or adjusted under 35 U.S.C. 154(b) by 0 days.

(21) Appl. No.: 15/185,852

(22) Filed: Jun. 17, 2016

(65) Prior Publication Data

US 2016/0368711 A1 Dec. 22, 2016

Related U.S. Application Data

(60) Provisional application No. 62/181,444, filed on Jun. 18, 2015.

(51) Int. Cl.
| | |
|---|---|
| *B65G 17/06* | (2006.01) |
| *B65G 17/26* | (2006.01) |
| *B65G 17/08* | (2006.01) |

(52) U.S. Cl.
CPC .................................. *B65G 17/083* (2013.01)

(58) Field of Classification Search
CPC ................................ B65G 17/06; B65G 17/26
USPC .................................. 198/850, 851, 852, 853
See application file for complete search history.

(56) References Cited

U.S. PATENT DOCUMENTS

| | | | | | |
|---|---|---|---|---|---|
| 4,629,063 | A | * | 12/1986 | Hodlewsky | B65G 37/005 198/626.6 |
| 4,972,942 | A | * | 11/1990 | Faulkner | B65G 17/086 198/853 |
| 5,156,264 | A | * | 10/1992 | Lapeyre | B65G 17/08 198/852 |
| 5,645,160 | A | * | 7/1997 | Palmaer | B65G 17/086 198/852 |

(Continued)

FOREIGN PATENT DOCUMENTS

WO 2010021116 A1 2/2010

OTHER PUBLICATIONS

Notification of Transmittal of the International Search Report (Forms PCT/ISA/220 and PCT/ISA/210) and the Written Opinion of the International Searching Authority (Form PCT/ISA/237) issued on Sep. 28, 2016, by the International Searching Authority in corresponding International Application No. PCT/US16/38017, (7 pages).

*Primary Examiner* — Douglas Hess
(74) *Attorney, Agent, or Firm* — Buchanan Ingersoll & Rooney PC (57) ABSTRACT

A conveyor belt including a plurality of spaced hinge rods, each of the plurality of rods including a first end and a second end; a plurality of plate elements including a first side edge and a second side edge, the plurality of plate elements overlying the spaced hinge rods such that the plurality of plate elements define a product support surface; wherein each side edge of the plate elements includes a side edge connector having a bendable retaining tab disposed at the first side edge and the second side edge and two holes for receiving a respective end of one of the hinge rods therein. The bendable retaining tab is configured to bend and thereby cover one of the two holes on the side edge connector, (Continued)

thereby restraining movement of the hinge rod within the respective hole.

19 Claims, 13 Drawing Sheets

(56) References Cited

U.S. PATENT DOCUMENTS

| | | | | |
|---|---|---|---|---|
| 5,996,776 | A * | 12/1999 | van Zijderveld | B65G 17/08 198/850 |
| 6,499,587 | B1 * | 12/2002 | Greve | B65G 17/08 198/853 |
| 6,763,936 | B2 * | 7/2004 | Marsetti | B65G 17/08 198/844.1 |
| 6,814,223 | B1 * | 11/2004 | Verdigets | B65G 17/08 198/844.1 |
| 7,108,127 | B2 * | 9/2006 | Krisl | B65G 17/08 198/850 |
| 7,255,227 | B2 * | 8/2007 | Melancon | B65G 17/40 198/853 |
| 7,987,972 | B2 | 8/2011 | Hennigar et al. | |
| 8,636,141 | B2 * | 1/2014 | Neely | B65G 17/086 198/850 |
| 8,757,366 | B2 * | 6/2014 | MacLachlan | B65G 17/08 198/844.1 |
| 9,206,826 | B2 * | 12/2015 | Bindig | F16B 15/08 |
| 9,212,003 | B2 * | 12/2015 | Gabler | B65G 17/086 |
| 2008/0142342 | A1 | 6/2008 | Stebnicki et al. | |
| 2008/0164128 | A1 | 7/2008 | Ririe | |
| 2013/0140151 | A1 | 6/2013 | Neely et al. | |
| 2014/0027251 | A1 | 1/2014 | Cornelissen et al. | |

* cited by examiner

PLATE CONVEYOR BELT

TECHNICAL FIELD

The present invention is directed to a conveyor belt, and more particularly to a conveyor belt including a plurality of plate elements having side edge connectors and spaced hinge rods.

BACKGROUND

Wire conveyor belts have been in the market for many years. Wire conveyor belts are ideal for material handling, cooking, icing, slicing breading, cooling, filling, inspecting, and packing of products like breads, rolls, buns, donuts, confections, cakes, pies, pastries, light loads of meat, seafood, poultry, and processed products. They are also excellent for light-duty applications in metalworking and other industries. The simple, open design of wire conveyor belts provides efficient operation with minimum maintenance and easy cleanup to meet sanitation requirements.

It has been found in some instances, however, that the rods of a wire conveyor belt can leave a mark on the product that runs on top of the belt. The markings may become even more prominent if the product is heated while it is on the belt or put under pressure, or if the product being conveyed is naturally soft or pliable. Since product appearance is an important part of any mass produced food item, the marking can be a barrier to the use of a wire conveyor belt to carry a product that has traditionally not been in contact with a belt and has a smooth surface.

Accordingly, there exists a need in the marketplace for a conveyor belt having a smooth product support surface that will not mark product being conveyed, even when heated.

SUMMARY

The disclosure herein provides a conveyor belt including a plurality of spaced hinge rods and a plurality of plate elements disposed overlying the rods. The plate elements can be generally smooth such that when a product is being conveyed on the support surface no marking occurs from the plate elements or the underlying rods. Alternatively, the plate elements may include a predetermined marking or cut-out section, such as a logo, artistic design, pattern, or other graphic or text message on the upper surface thereof such that when a product is being conveyed on the support surface the marking on the plate element is imparted into the product while it is being conveyed.

BRIEF DESCRIPTION OF THE DRAWING FIGURES

These and other features and advantages of the disclosure will become more readily apparent to those skilled in the art upon reading the following detailed description, in conjunction with the appended drawings in which.

DETAILED DESCRIPTION OF THE PREFERRED EMBODIMENTS

A conveyor belt in accordance with an exemplary embodiment of the disclosure is shown generally in FIGS. 1-6 by reference numeral 100. Conveyor belt 100 preferably comprises a plurality of spaced hinge rods 110 disposed in succession and transversely with respect to a direction of travel of the conveyor belt 100, and a plurality of plate elements 140 disposed overlying the rods 110. Each rod 110 has two ends 112 and 114. The rods 110 are preferably formed from a metal wire, such as stainless steel, AISI T-304, or any similar metal wire. The leading edge of the plate element 140 is bent downward at an approximately ninety-degree angle to form a plate angle portion or lip 142. The bent front lip 142 of the carrying surface on each plate element 140 increases the rigidity of the plate element across its width and thus decreases the chance of any bending to occur across the width thereof. In addition, the bent front lip 142 on the leading edge of the plate element 140 also reduces the likelihood of product pinching between the plate elements. The plate elements 140 are secured to the rods 110 by a plurality of side edge connectors 150. The plate elements are preferably formed from a metal material, such as stainless steel, or any other material usable in the end use environment. The plate elements could also be formed from a plastic material, such as Acetal. The side edge connectors 150 are preferably formed of the same material as the plate elements.

Figure 7:
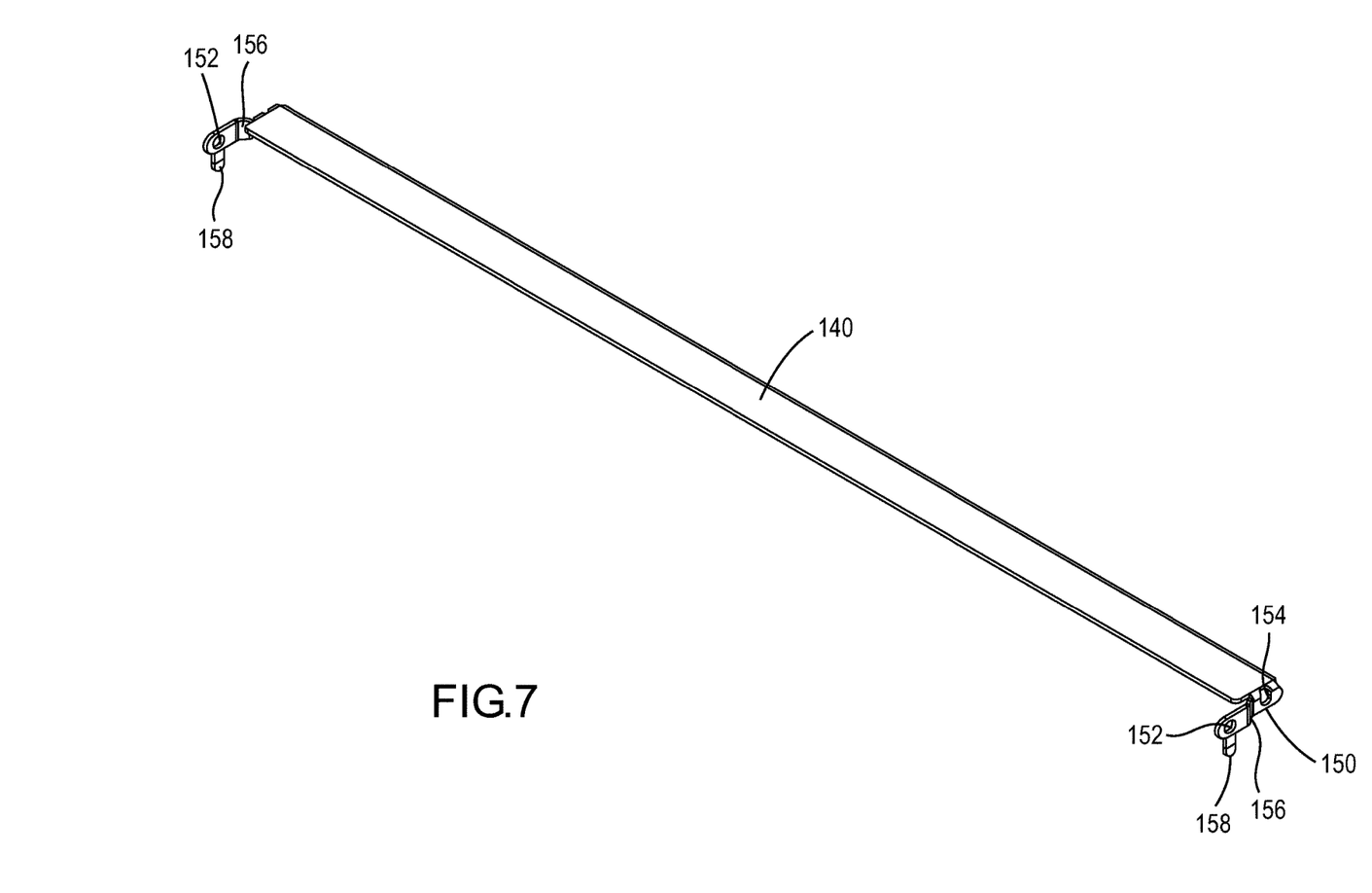
FIG. 7 is a top perspective view of a plate element in the conveyor belt shown in FIG. 1.
Figure 8:
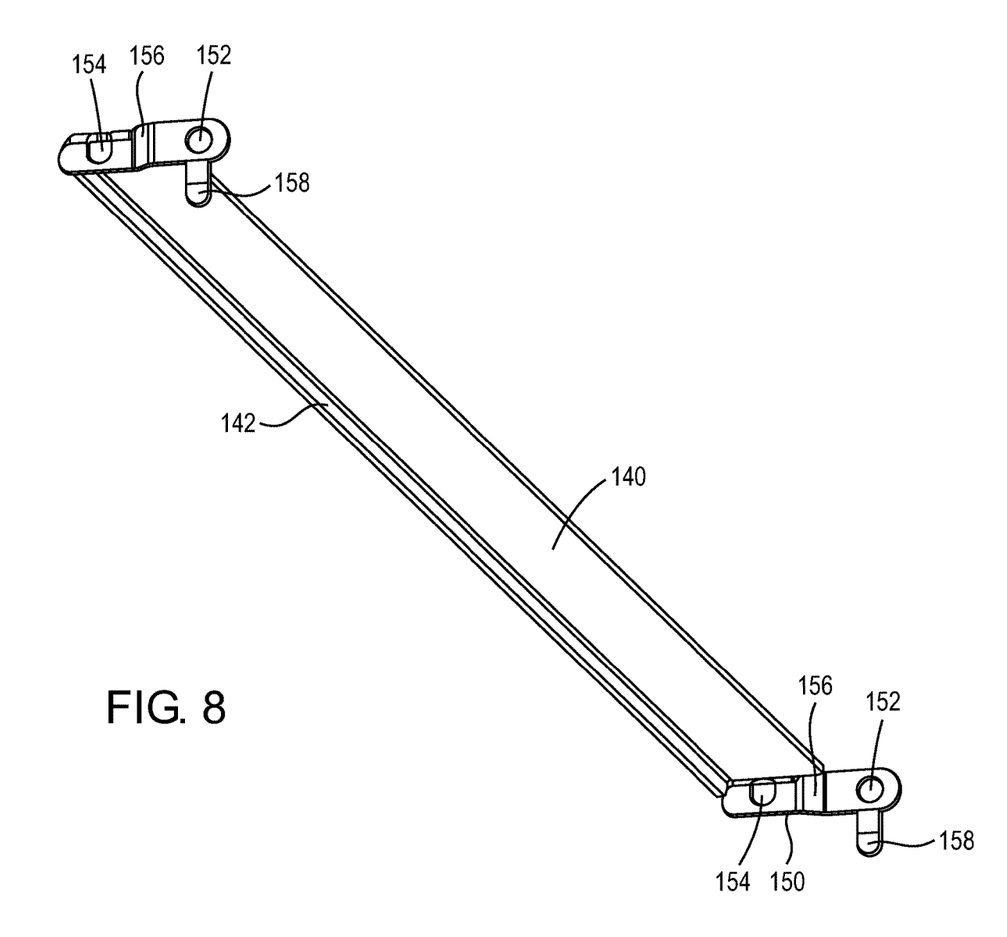
FIG. 8 is bottom perspective view thereof.
Figure 9:
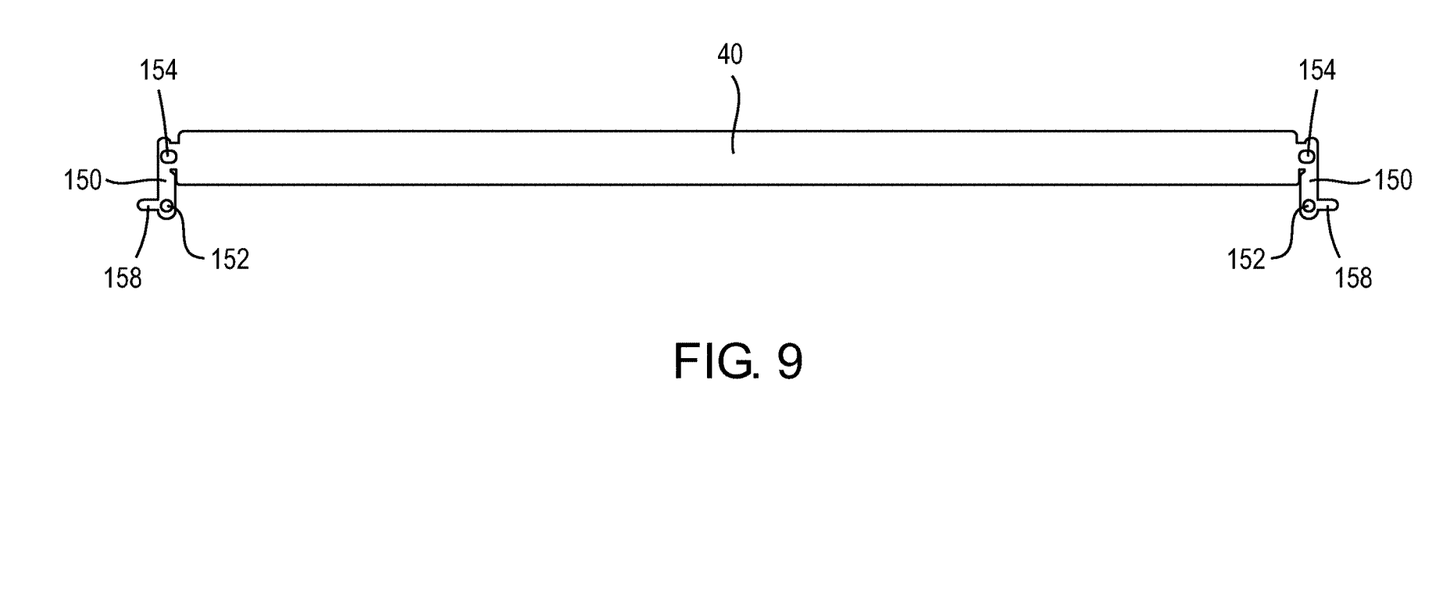
FIG. 9 is a top plan view of a plate element used in the conveyor belt shown in FIG. 1, prior to assembly.

Referring to FIG. 9, the side edge connectors 150 are oriented with a length perpendicular to a longitudinal axis of the plate element 140. When assembled, the side edge connectors 150 are bent down, perpendicular to the carrying surface of the conveyor belt 100, as best shown in FIGS. 7-8. The connectors 150 each include two holes 152, 154, aligned perpendicular to the width of the plate element 140 and staggered by an offset bend 156 in the perpendicular portion of connector 150. Each side edge connector 150 further includes a retaining tab 158 that is aligned with a center of one of the two holes 152, 154.

Figure 1:
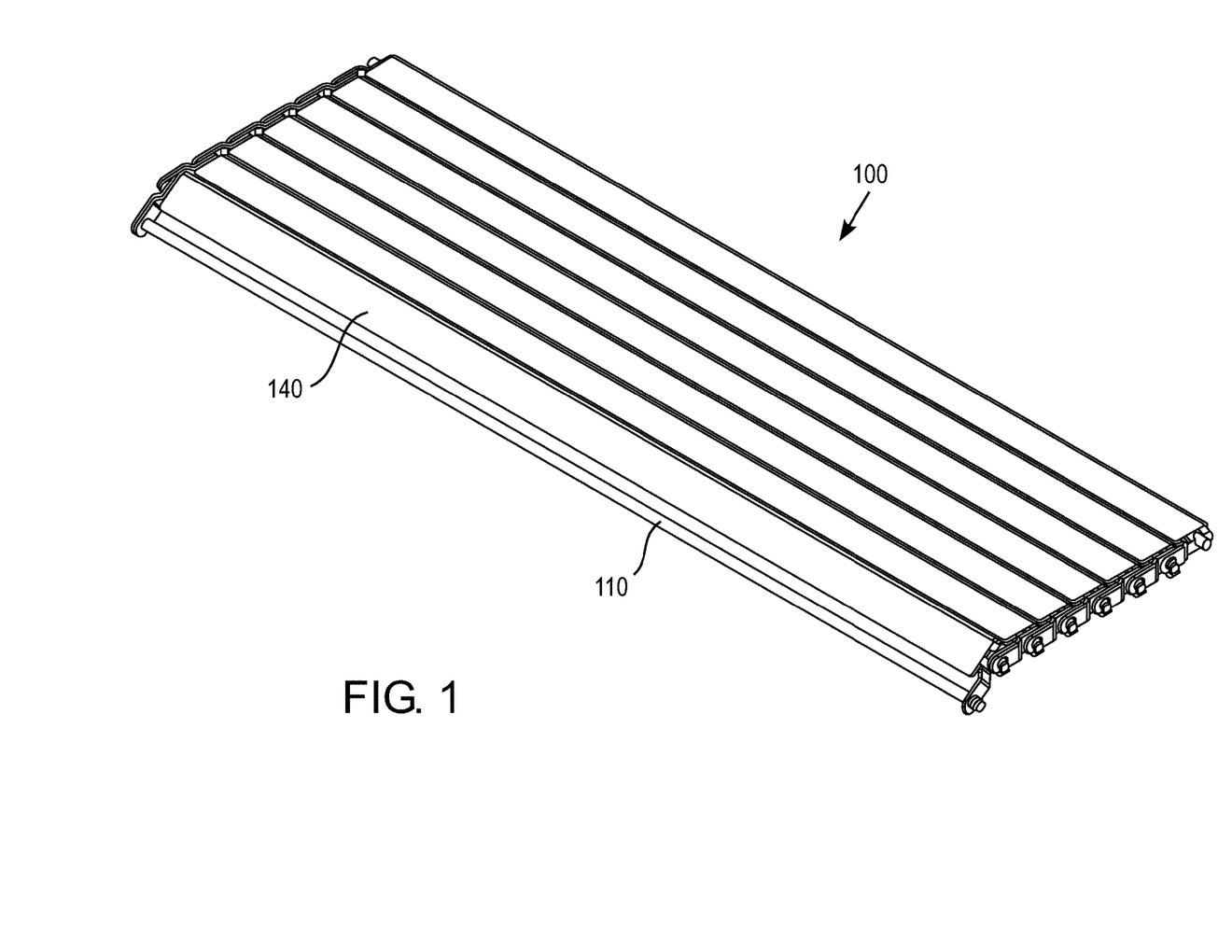
FIG. 1 is a top perspective view of an exemplary embodiment of a plate conveyor belt according to the disclosure.
Figure 2:
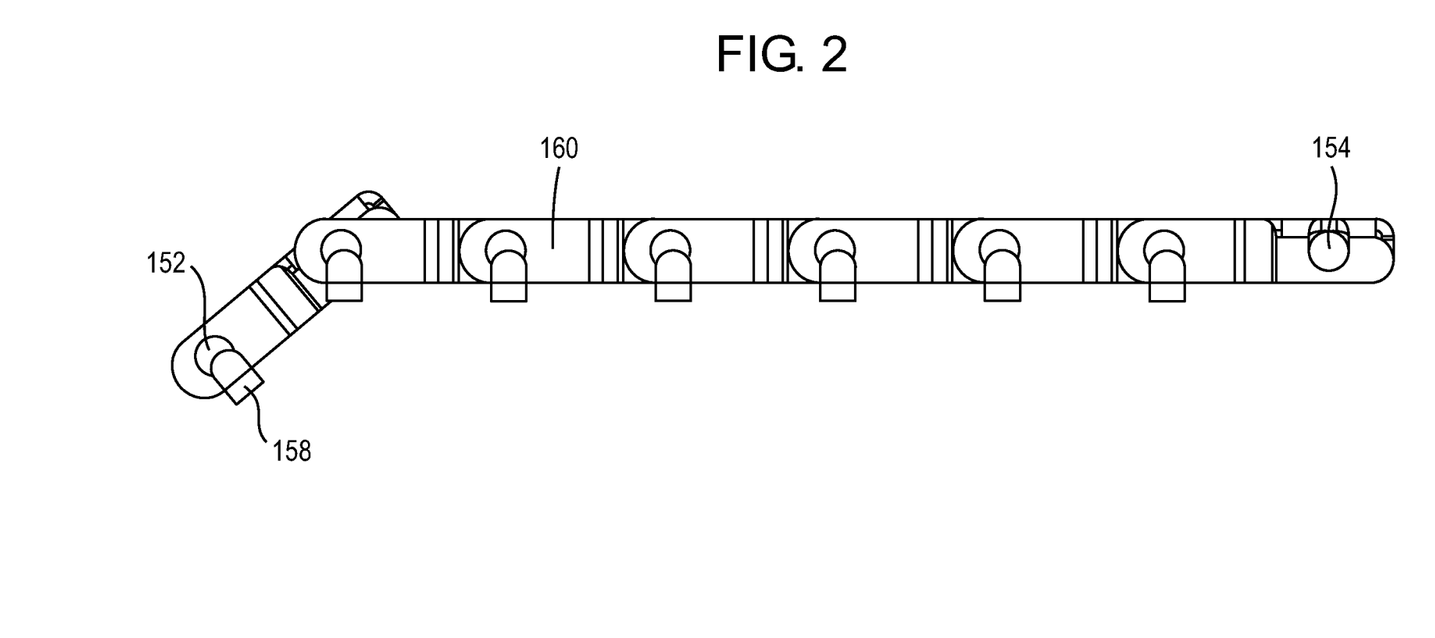
FIG. 2 is a side elevational view thereof.
Figure 3:
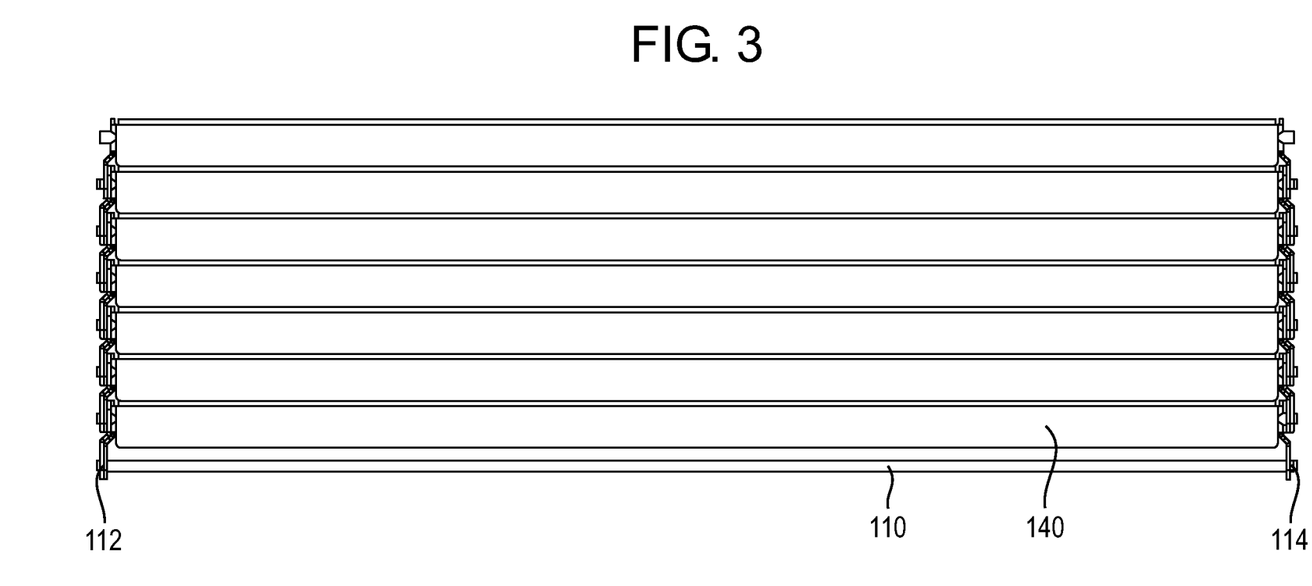
FIG. 3 is a top plan view thereof.
Figure 4:
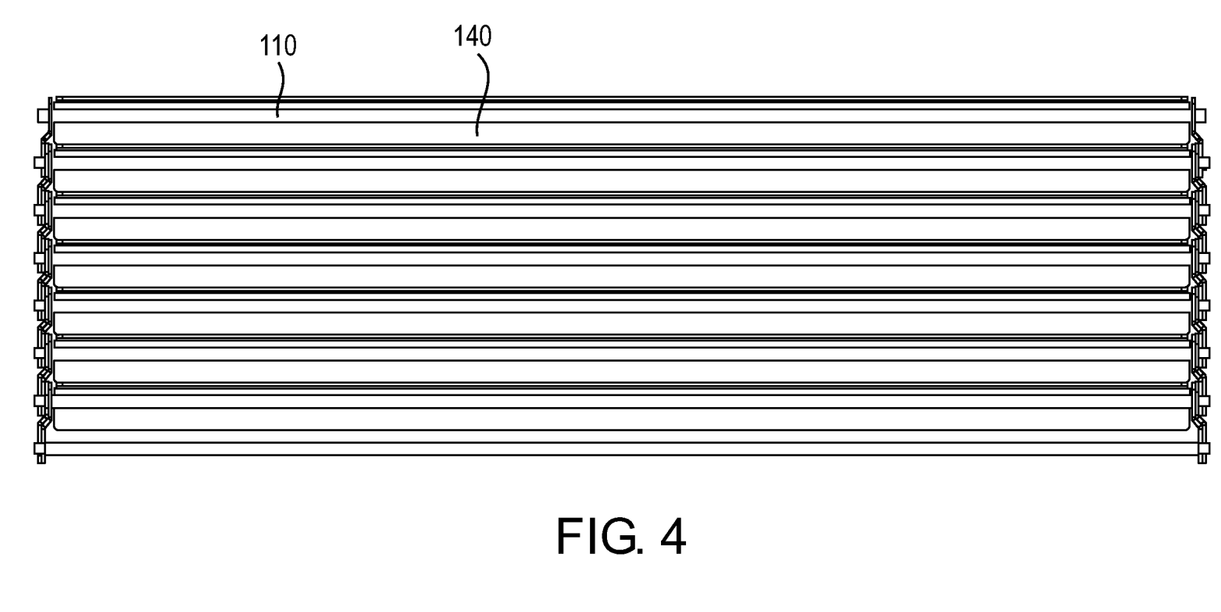
FIG. 4 is a bottom plan view thereof.
Figure 5:
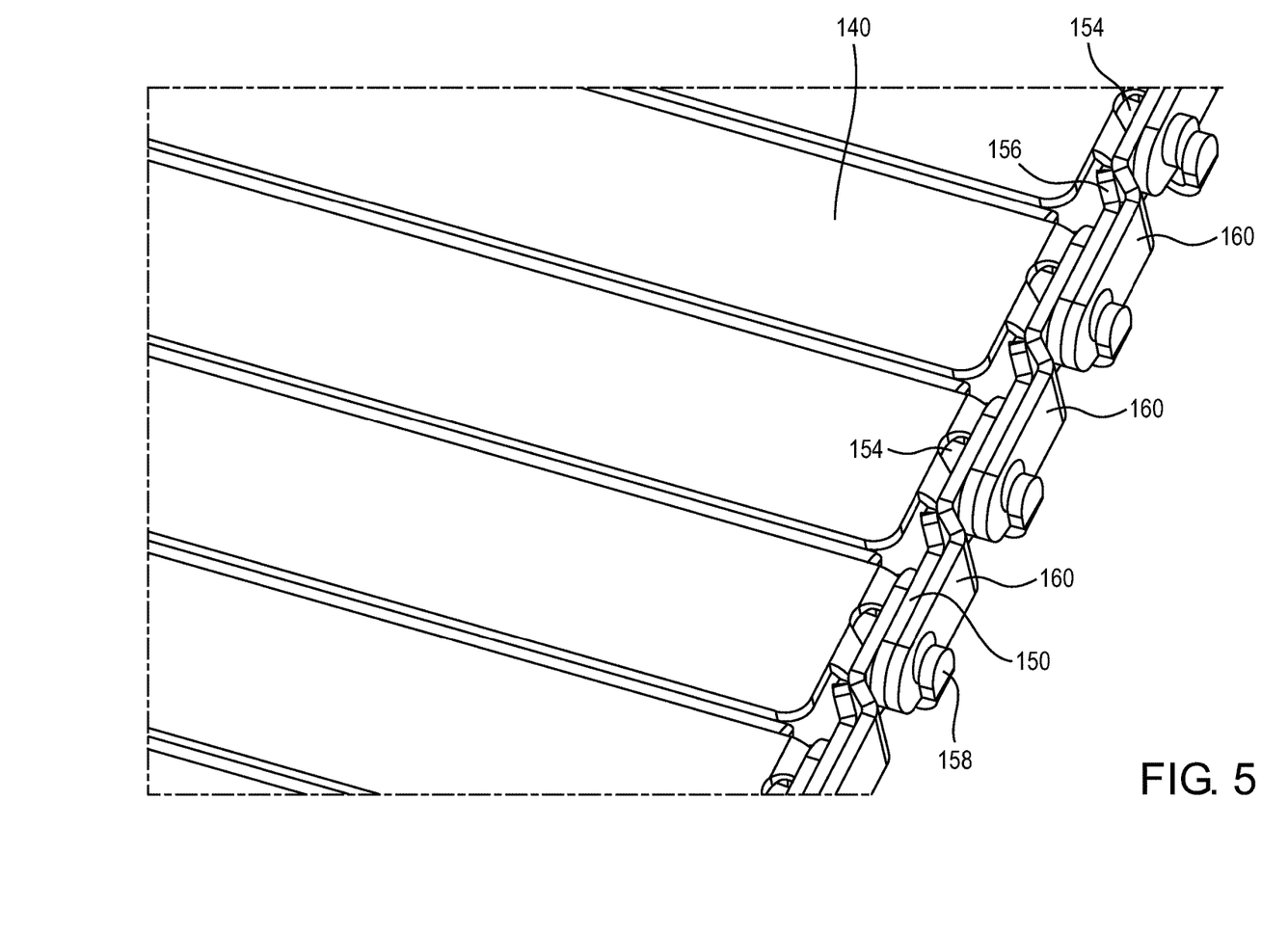
FIG. 5 is an enlarged partial perspective view thereof.
Figure 6:
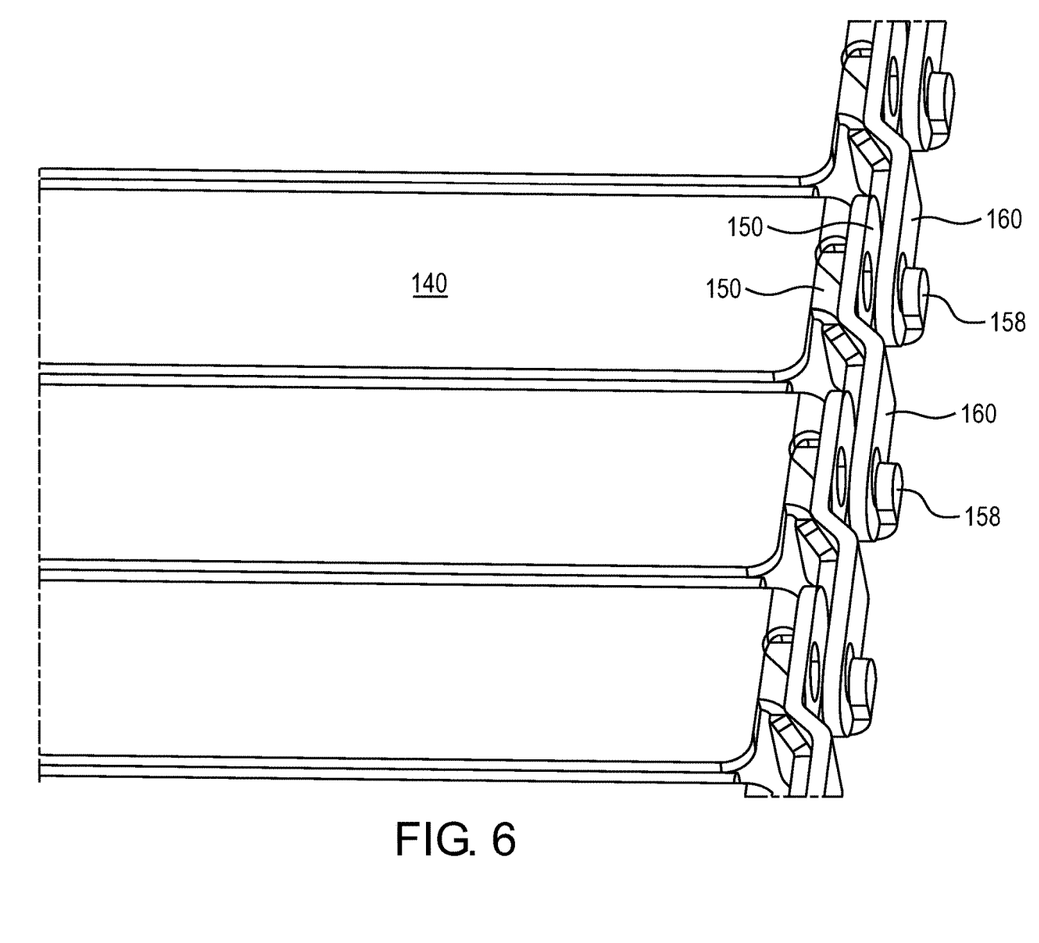
FIG. 6 is an enlarged partial perspective view thereof.
Figure 10:
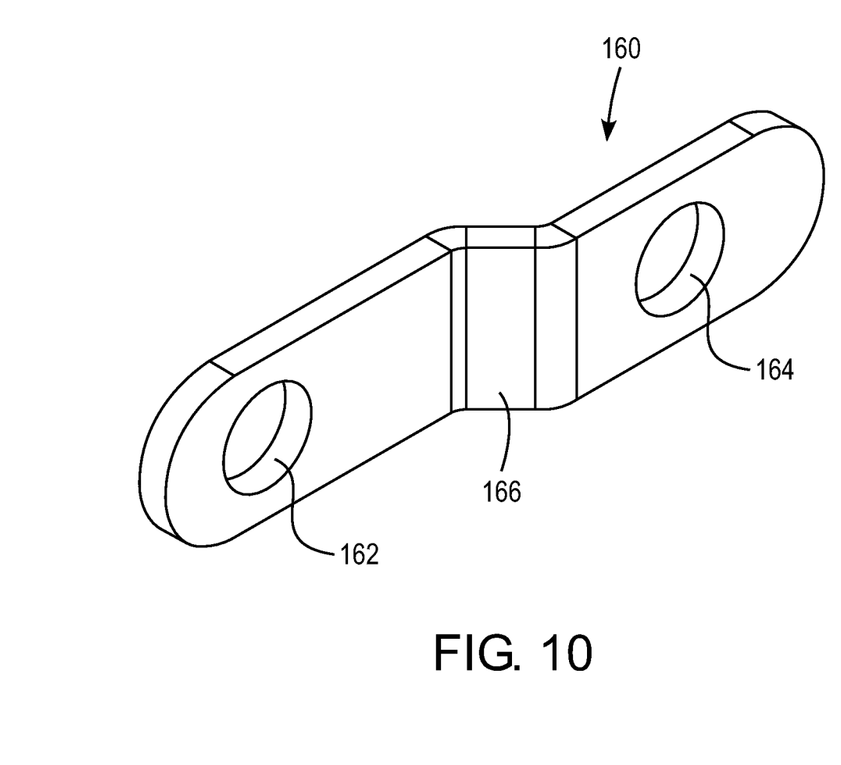
FIG. 10 is a perspective view of a side bar used in the conveyor belt shown in FIG. 1, prior to assembly.
Figure 11:
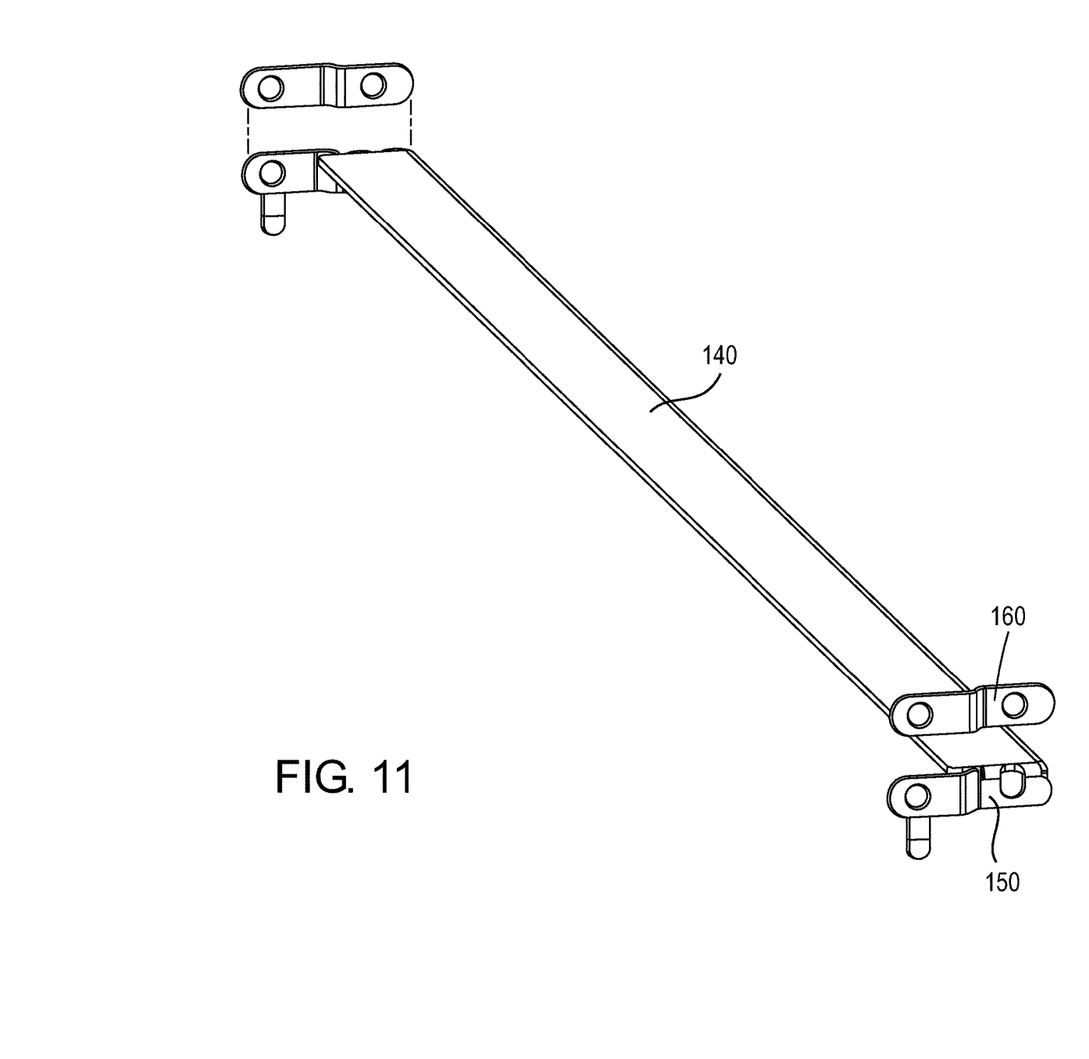
FIG. 11 is an exploded perspective view of a plate element and a side bar used in the conveyor belt shown in FIG. 1, prior to assembly.
Figure 12:
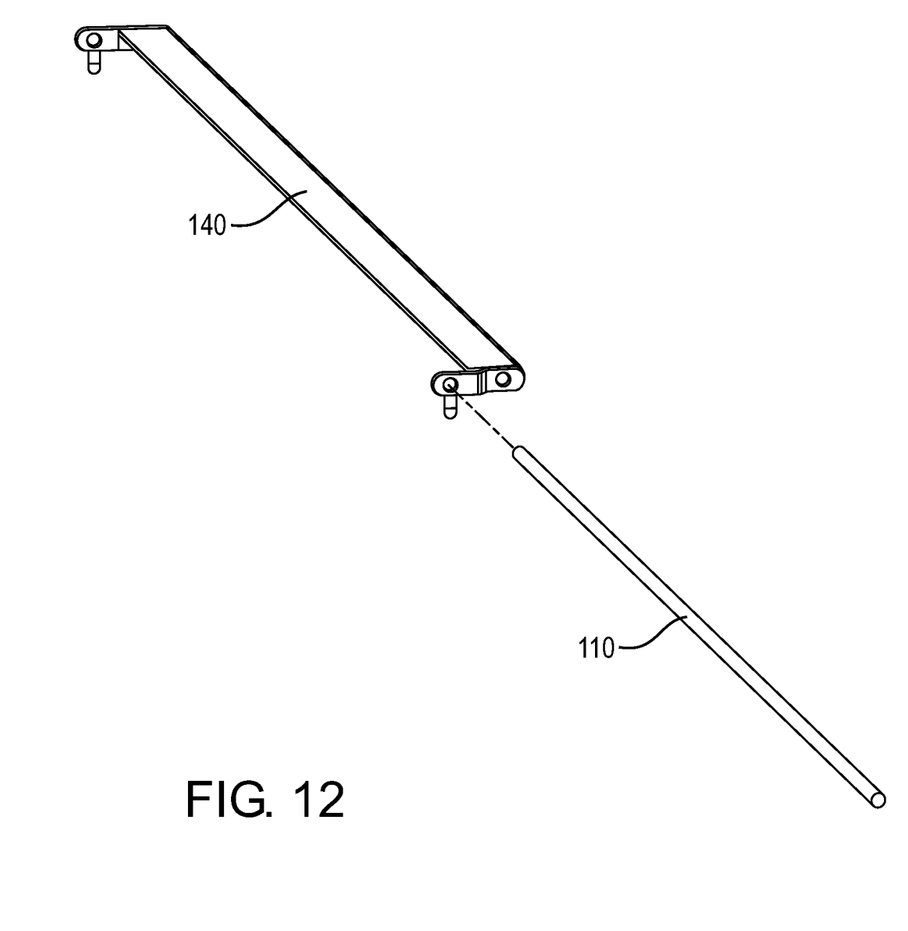
FIG. 12 is an exploded perspective view of a plate element and a hinge rod used in the conveyor belt shown in FIG. 1, prior to assembly.
Figure 13:
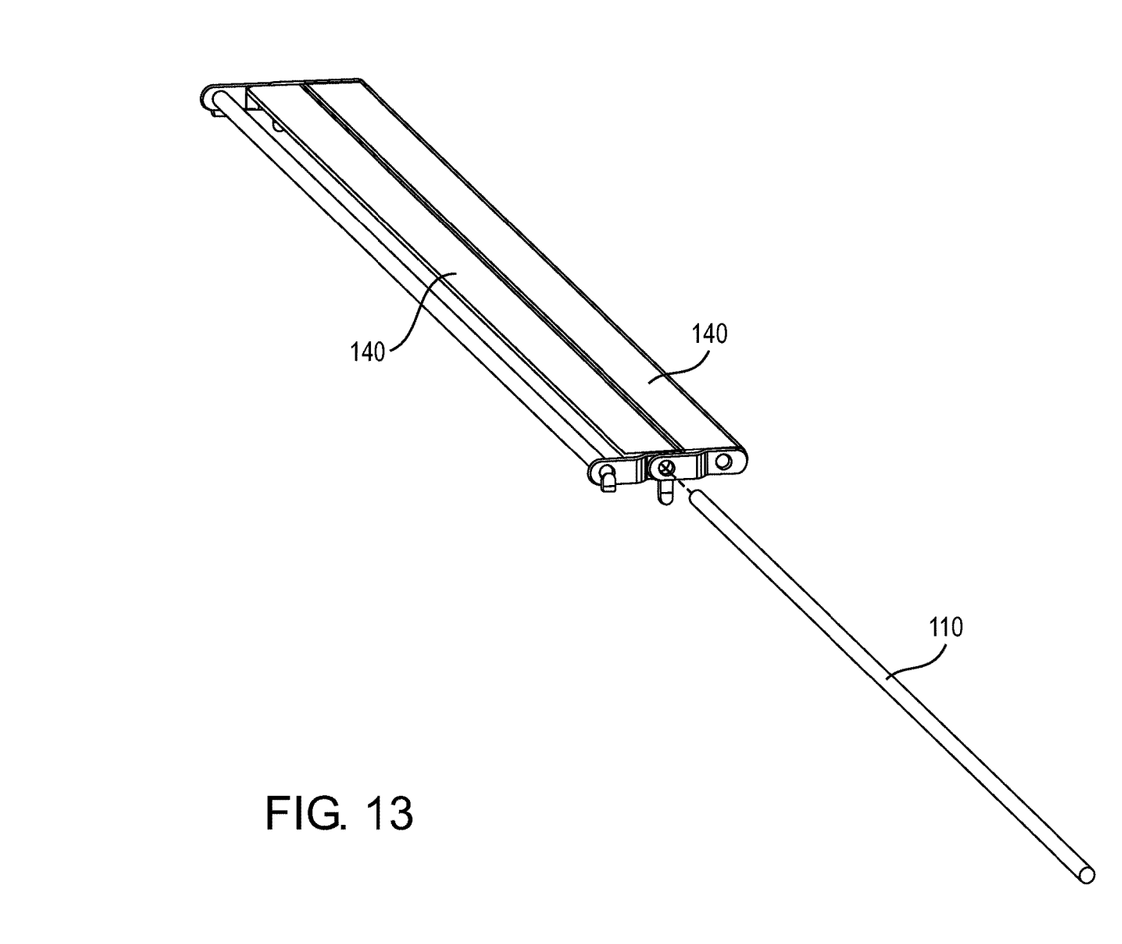
FIG. 13 is an exploded perspective view of several plate elements and a hinge rod illustrating splicing of portions of the conveyor belt shown in FIG. 1.

Referring also to FIGS. 10-11, conveyor belt 100 may optionally include reinforcing bars 160 including two holes 162, 164 and an offset bend 166 which generally correspond to the shape of the offset bend 156 and hole pattern 152, 154 on the side edge connectors 150. The use of reinforcing bars 160 is preferred in order to create an increased bearing area and a resulting increased life of the belt 100. After the spaced rods 110 are installed through holes 152, 154, the reinforcing bars 160 may be disposed outwardly and adjacent the side edge connectors 150 to provide additional strength to the edge of the conveyor belt 100. The retaining tabs 158 are then bent upward, around the reinforcing bars 160, so as to prevent the rods 110 from moving out from the respective hole 152, 154, as best shown in FIGS. 5-6. The implementation of the retaining tabs 158 in conveyor belt 100 allows for a weldless belt assembly. Moreover, the retaining tabs 158 allow a user to remove hinge rods 110 simply by bending the retaining tab 158 downward and removing the rod 110. Thus, referring to FIGS. 12 and 13, in order to splice together portions of belting, the user can bend the retaining tab 158 downward and remove the rod 110, align a new segment of belting, and then reinsert the rod 110 and bend the tab back into place (upwards). The conveyor belt 100 thus affords a splicing procedure requiring only the use of pliers and not complex equipment or tools.

As assembled, the conveyor belt 100 has the ability for bidirectional articulation. That is, unlike many similar plated belts, conveyor belt 100 is able to perform a reverse-bend, or "back-bend", without creating large gaps between the plates.

As described above in accordance with a first exemplary embodiment of the disclosure, the plate elements 140 are generally smooth. In this instance, when a product is being conveyed on the support surface of the plate elements 140, no marking occurs from the plate elements 140 or the underlying rods 110.

In a further embodiment, however, plate elements 140 may include a predetermined marking, such as a logo, artistic design, pattern, or other graphic or text message on the upper surface thereof, as described in U.S. Pat. No. 7,987,972 to the present assignee, the entire contents of which are hereby incorporated by reference. The marking will preferably be formed by a pattern in the plate element. Thus, when a product is being conveyed on the support surface, the marking on the plate element 140 is embossed into the product while it is being conveyed. Alternatively, if the plate element 140 includes a cut-out section that allows uneven heating, marking can occur by scorching of a pattern onto the product during a toasting/cooking application.

While the present invention has been described with respect to an exemplary embodiments of the disclosure, this is by way of illustration for purposes of disclosure rather than to confine the invention to any specific arrangement as there are various alterations, changes, deviations, eliminations, substitutions, omissions and departures which may be made in the particular embodiment shown and described without departing from the scope of the claims.

The invention claimed is:

1. A conveyor belt comprising:
    a plurality of spaced hinge rods, each of said plurality of rods including a first end and a second end, said plurality of rods being disposed transversely with respect to a direction of travel of the conveyor belt; and
    a plurality of plate elements including a first side edge and a second side edge, the plurality of plate elements overlying said spaced hinge rods, whereby said plurality of plate elements define a product support surface;
    wherein each of said plurality of plate elements includes a side edge connector having a bendable retaining tab disposed at the first side edge and the second side edge;
    wherein each said side edge connector further includes two holes for receiving a respective end of one of said hinge rods therein; and
    wherein said bendable retaining tab is configured to bend and thereby cover one of said two holes on said side edge connector, thereby restraining movement of said hinge rod within said respective hole.

2. The conveyor belt according to claim 1, wherein said plurality of plate elements are generally smooth such that the product support surface defines a generally smooth surface.

3. The conveyor belt according to claim 1, wherein at least one of said plurality of plate elements includes a predetermined marking.

4. The conveyor belt according to claim 1, wherein said plate elements are stainless steel.

5. The conveyor belt according to claim 1, wherein each said plate element includes a lip extending along a longitudinal edge of the plate element.

6. The conveyor belt according to claim 5, wherein the lip is bent at an approximately 90 degree angle relative to the product support surface.

7. The conveyor belt according to claim 1, wherein each said side edge connector includes an offset bend between said two holes.

8. The conveyor belt according to claim 7, further comprising a reinforcing bar adjacent said side edge connector.

9. The conveyor belt according to claim 8, wherein said reinforcing bar has a shape corresponding to said side edge connector, including the offset bend and said two holes of said side edge connector.

10. The conveyor belt according to claim 1, further comprising a reinforcing bar adjacent said side edge connector.

11. A conveyor belt comprising:
    a plurality of spaced hinge rods, each of said plurality of rods including a first end and a second end, said plurality of rods being disposed transversely with respect to a direction of travel of the conveyor belt; and
    a plurality of plate elements including a first side edge and a second side edge, the plurality of plate elements overlying said spaced hinge rods, whereby said plurality of plate elements define a product support surface;
    wherein each of said plurality of plate elements includes a side edge connector having a bendable retaining tab disposed at the first side edge and the second side edge;
    wherein each said side edge connector further includes two holes for receiving a respective end of one of said hinge rods therein; and
    wherein each said side edge connector includes an offset bend between said two holes.

12. The conveyor belt according to claim 11, wherein said bendable retaining tab is configured to bend and thereby cover one of said two holes on said side edge connector, thereby restraining movement of said hinge rod within said respective hole.

13. The conveyor belt according to claim 11, wherein said plurality of plate elements are generally smooth such that the product support surface defines a generally smooth surface.

14. The conveyor belt according to claim 11, wherein at least one of said plurality of plate elements includes a predetermined marking.

15. The conveyor belt according to claim 11, wherein said plurality of plate elements are stainless steel.

16. The conveyor belt according to claim 11, wherein each of said plurality of plate elements includes a lip extending along a longitudinal edge of the plate element.

17. The conveyor belt according to claim 16, wherein the lip is bent at an approximately 90 degree angle relative to the product support surface.

18. The conveyor belt according to claim 11, further comprising a reinforcing bar adjacent said side edge connector.

19. The conveyor belt according to claim 18, wherein said reinforcing bar has a shape corresponding to said side edge connector such that said reinforcing bar includes a corresponding offset bend and two holes.

* * * * *